June 2, 1931.　　　　A. C. HOWARD　　　　1,808,113
CANE HARVESTING APPARATUS
Filed April 17, 1929　　　13 Sheets-Sheet 1

Fig.1

A.C. Howard
INVENTOR

By: Marks & Clerk
Attys.

June 2, 1931.    A. C. HOWARD    1,808,113
CANE HARVESTING APPARATUS
Filed April 17, 1929    13 Sheets-Sheet 3

June 2, 1931.　　　　A. C. HOWARD　　　　1,808,113
CANE HARVESTING APPARATUS
Filed April 17, 1929　　　13 Sheets-Sheet 5

June 2, 1931.  A. C. HOWARD  1,808,113
CANE HARVESTING APPARATUS
Filed April 17, 1929  13 Sheets-Sheet 9

FIG.16.

A. C. Howard
INVENTOR
By: Marks & Clark
Attys.

Patented June 2, 1931

1,808,113

UNITED STATES PATENT OFFICE

ARTHUR CLIFFORD HOWARD, OF NORTHMEAD, NEW SOUTH WALES, AUSTRALIA

CANE HARVESTING APPARATUS

Application filed April 17, 1929, Serial No. 355,854, and in Australia April 23, 1928.

This invention relates to improvements in cane harvesting apparatus of the type in which the cane stalks are gathered, cut, and transferred by their butt ends through a conveyor to means whereby the said stalks can have removed therefrom the tops and leaves and the said tops and leaves can be chopped.

A further object of the invention is to provide means whereby the cut cane stalks will be gathered and transferred by their butt ends through a conveyor to means whereby such stalks can be topped.

Another object of the invention is to provide means whereby the tops and trash can be chopped.

A still further object of the invention is to provide means whereby a bundle of topped cane stalks can be delivered from the apparatus.

Further objects of the invention and details thereof are set forth in the following description thereof and the accompanying drawings and also in the appended claims.

Referring to the accompanying drawings in which the invention is illustrated.

Figure 3:
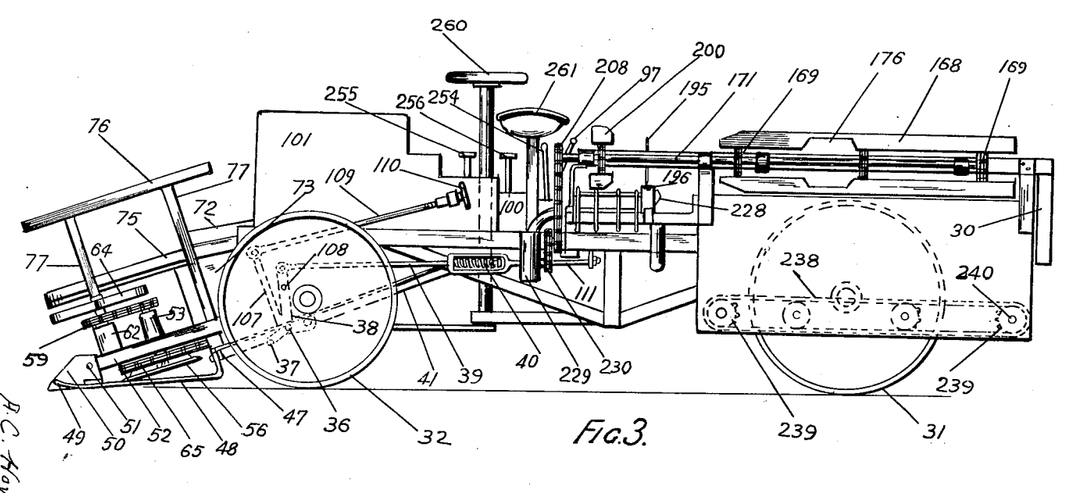
Figures 20, 21, 22:
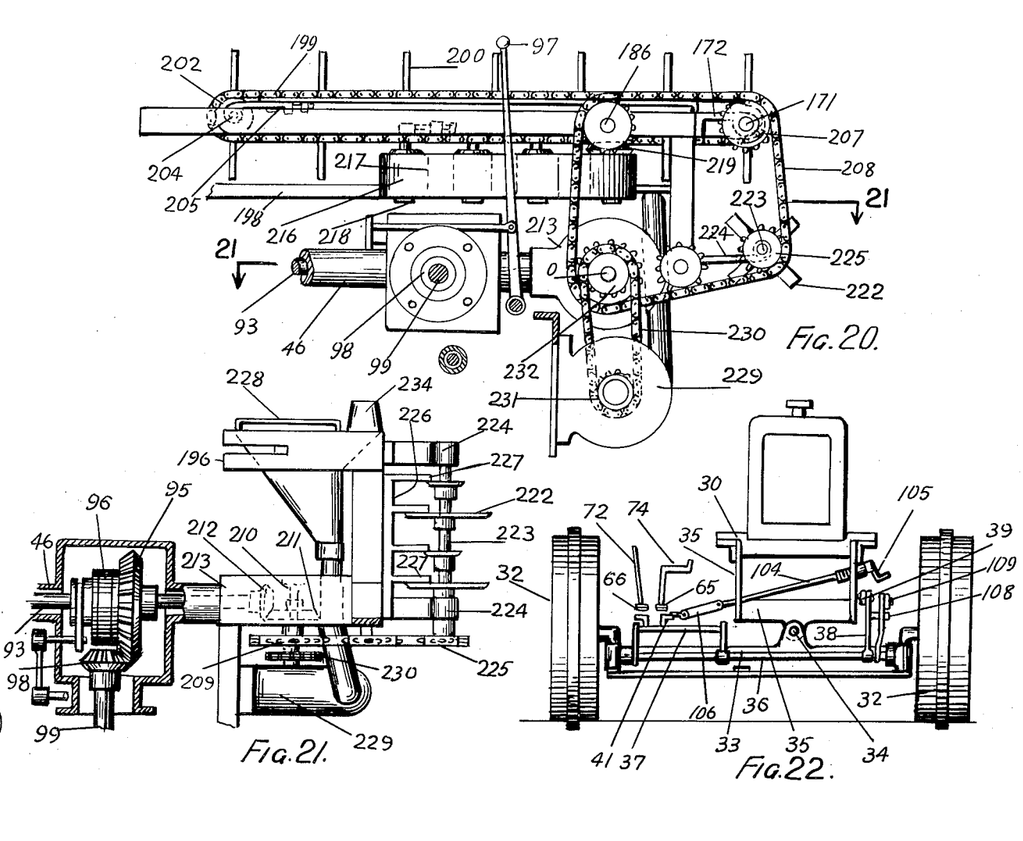
Fig. 21 is a sectional plan on line 21—21 of Fig. 20.
Fig. 22 is a front sectional elevation of the apparatus.

Said apparatus is provided with a main framing 30 upon which are mounted driving wheels 31 and steerable wheels 32; the axle 33 (Fig. 22) of the steerable wheels 32 are pivotally connected at 34 to the depending frame 35 which is rigidly affixed to the main framing 30. Rotatably mounted on the axle 33 is a shaft 36 (Fig. 1) which carries a radial outrigger framing 37; the latter is connected by the lever 38 (Fig. 3) on the shaft 36 to a counterbalancing coil spring 40 which is mounted on the rod 39.

Figures 9, 10, 11, 12, 13:
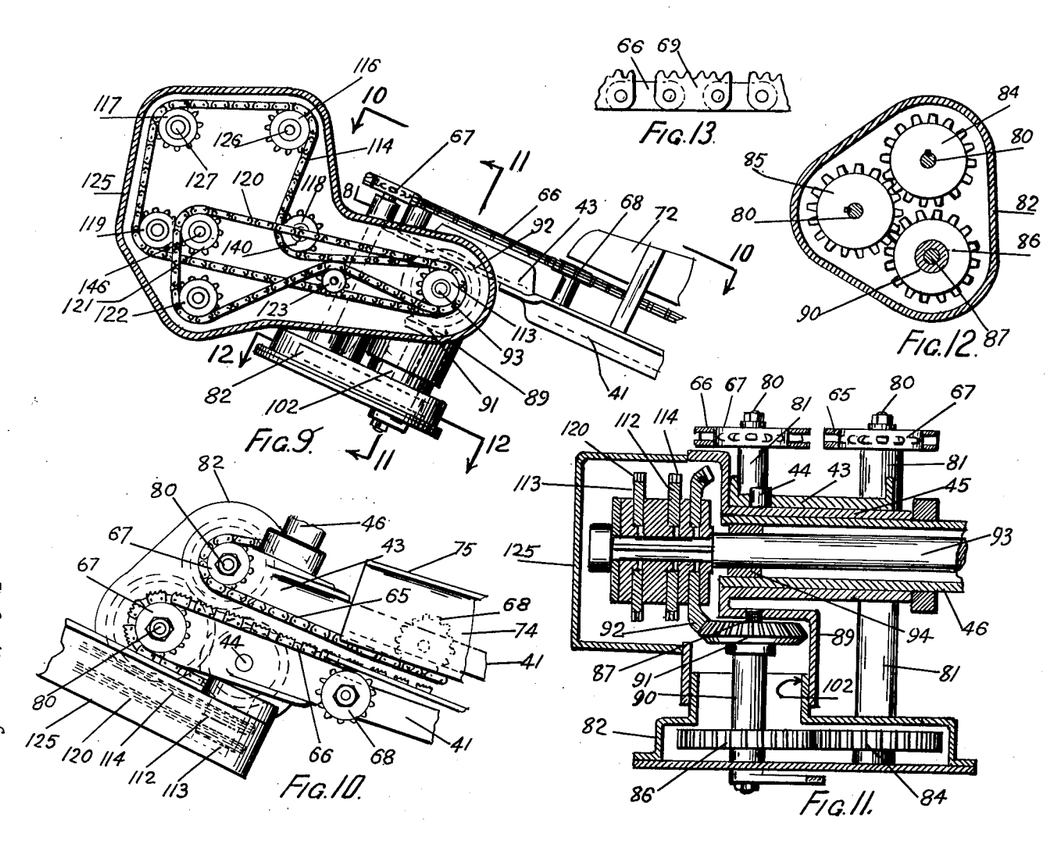
Fig. 9 is an enlarged elevational view of top or delivery end of the cane stalk elevator.
Fig. 10 is a plan view on line 10—10 of Fig. 9.
Figs. 11 and 12 are sectional views respectively on lines 11—11 and 12—12 of Fig. 9.
Fig. 13 is a detail view of the cane elevator chain.

The outrigger framing 37 (Figs. 4 and 5) is adapted to loosely receive means for cane gathering, cutting and elevating mechanism of the apparatus which consists of a pair of inclined elements 41 which are braced by transverse members 42; the members 41 are suitably connected at the top end thereof to a table 43 (Fig. 11). The table 43 may be pivotally connected at 44 to a bracket 45 which is rotatably mounted upon a tubular member 46, the latter being rigidly affixed to the main framing 30.

Figure 4:
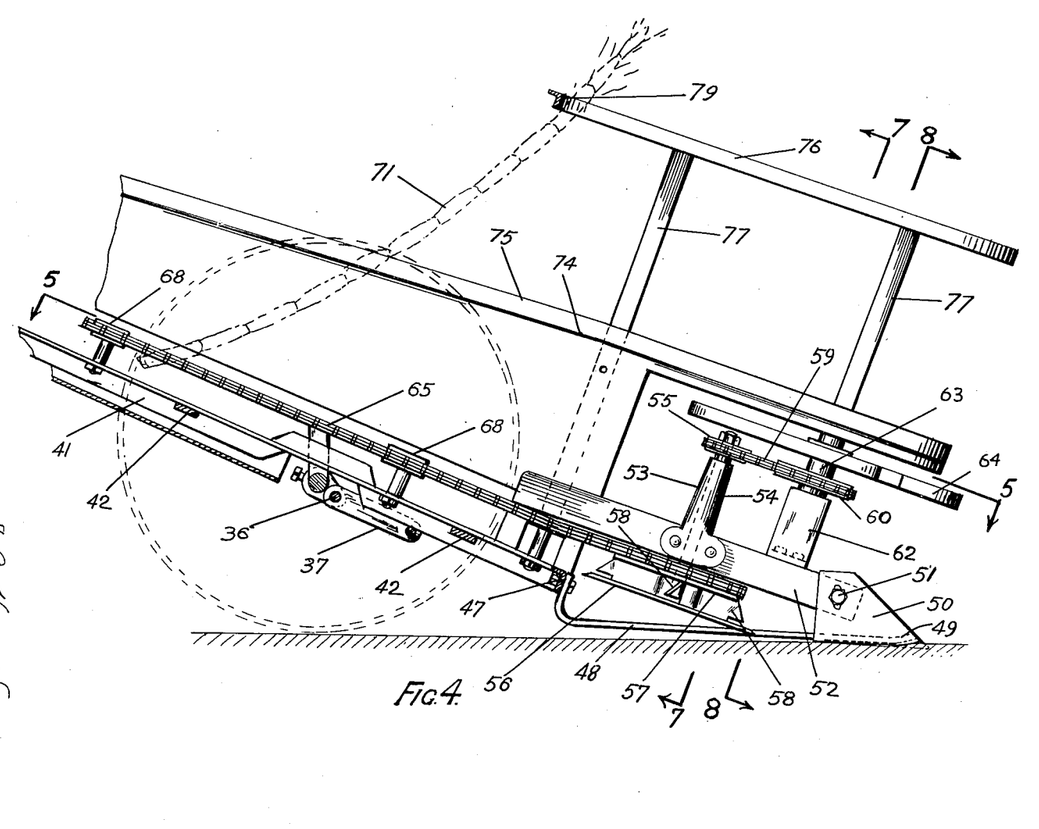
Fig. 4 is an enlarged sectional elevation showing the cane gathering, cutting, and elevating mechanism for cut cane stalks.
Figure 5:
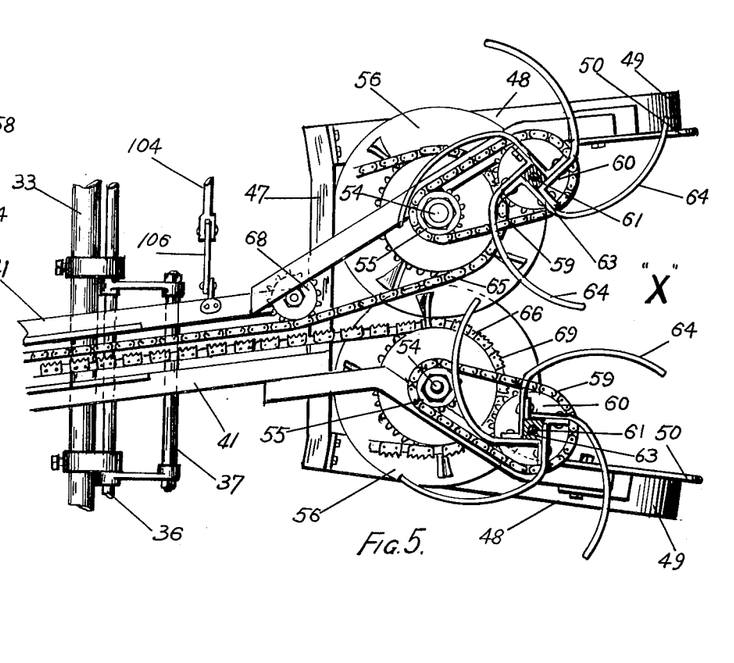
Fig. 5 is a sectional plan on line 5—5 of Fig. 4.
Figure 6:
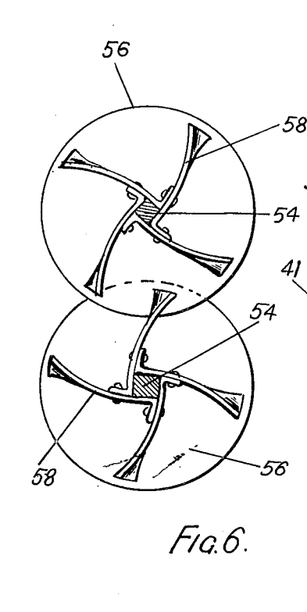
Fig. 6 is a sectional plan of the cutters.

At the forward ends of the elements 41 is a transverse member 47 (Fig. 5) from the opposite ends of which may project angularly and forwardly a pair of skids 48. A space or bight X is provided between the skids 48 whereby cane to be cut can be gathered therein. The said skids 48 are adjustably affixed to the transverse member 47 and they have curved feet 49 (Fig. 4). To each of the skids 48 is affixed to lie vertically a ramp plate 50; said ramp plates 50 are also adjustably affixed at 51 to a pair of outrigger arms 52 (Fig. 4). The arms are rigidly affixed at their rear end to the elements 41 and to the transverse member 47. On the outrigger arms 52 are vertically mounted the bearings 53 for the spindles 54 for the rotatable cutting blades 56; at the head of said spindles is affixed a sprocket wheel 55; and at the foot of said spindles are affixed the rotatable cutting blades 56. Carried by the spindles 54 between the cutters 56 and sprocket wheels 57 on said spindles are the spring spoons 58. Around the sprocket wheels 55 pass the chains 59 which also pass around the sprocket wheels 60 which are loosely mounted upon spindles 61 fixed on brackets 62, which are affixed to the outrigger arms 52. To the bosses 63 of the sprocket wheels 60 are affixed the spring tines 64 adapted to operate to enable gathering of cane into the space or bight X between the projecting skids 48.

Figure 1:
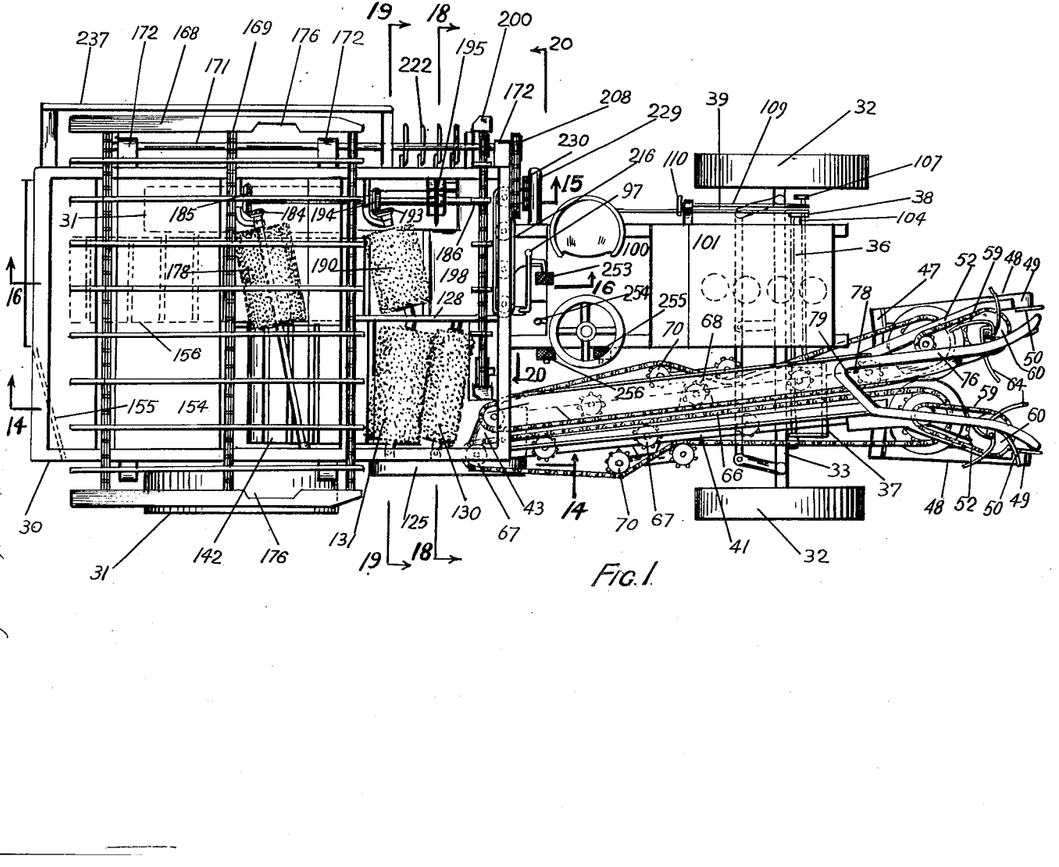
Fig. 1 is a plan view of the apparatus.

Around the sprocket wheels 57 pass the receiving portion of the endless conveyor chains 65 and 66; the latter have saw teeth 69 on the alternate links thereof (Fig. 13). Such endless conveyor chains 65 and 66 also pass around sprocket wheels 67 at the delivery portion thereof and also around guide sprocket wheels 68 (Fig. 10) which are loosely mounted on spindles which are affixed to the elements 41; such conveyor chains 65 and 66 also pass over the spring controlled jockey sprocket wheels 70 (Fig. 1). The endless chains 65 and 66 in passing in an upward direction from the sprocket wheels 57 to the delivery end of said chains will have their abutting faces maintained in close contact through the jockey sprocket wheels 70, whereby a stalk of cane 71 will be held firmly between the opposing faces of the said conveyor chains 65 and 66.

Figure 7:
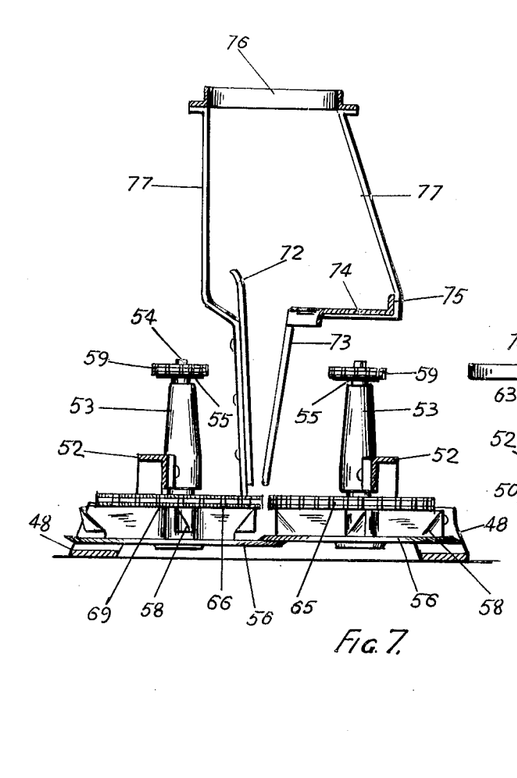
Figs. 7 and 8 are sectional elevations respectively on lines 7—7, 8—8 of Fig. 4.
Figure 8:
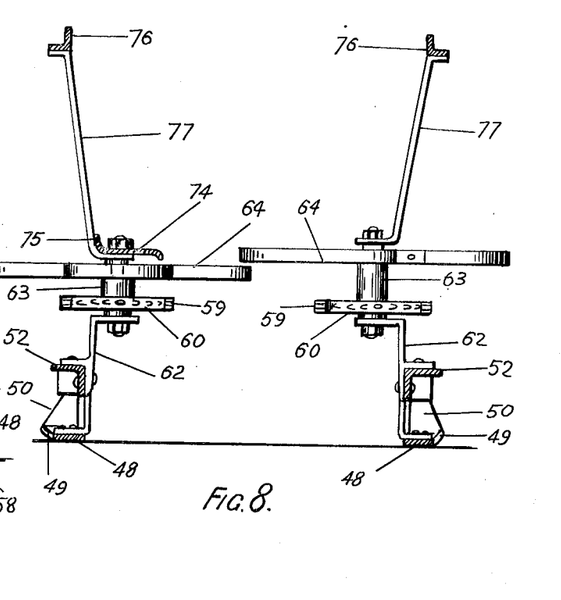

Above the endless conveyor chains 65 and 66 are located a pair of vertically arranged fenders 72 and 73 (Fig. 7). The latter fender has a ledge 74 with a flange 75; said ledge 74 is adapted at its forward end to project over the space or bight X.

Positioned above the forward end of the fenders 72 and 73 is a U-shaped framing 76 which may be rigidly mounted upon stanchions 77 affixed to the outrigger arms 52. The U-shaped framing 76 may have a flared mouth corresponding in width with the space or bight X and the rearward portion thereof may be provided with an angular contraction 78 (Fig. 25) the apex 79 of which is situated above the ledge 74, for a purpose to be hereinafter referred to.

Sprocket wheels 67 are mounted on vertically disposed spindles 80 (Figs. 9 to 12) carried in housings 81 which are rigidly secured to the table 43 and also to a casing 82; said spindles 80 are geared together by the gear wheels 84 and 85 located in the casing 82. The gear wheel 85 also meshes with a gear wheel 86 which is also located within the casing 82; gear wheel 86 is loosely mounted on a spindle 87 which is rigidly fixed in a housing 89, the housing 89 being formed integrally with the bracket 45 (Fig. 11).

Figure 16:
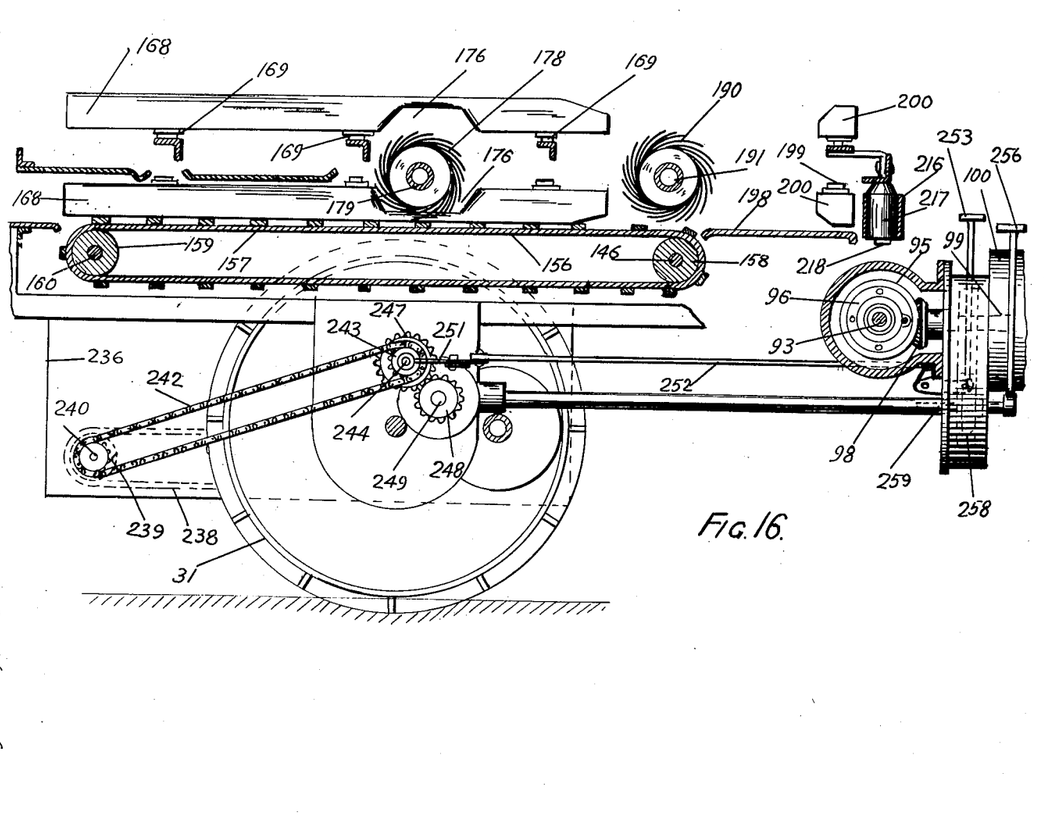

To the boss 90 of the gear wheel 86 is affixed a bevel wheel 91 which is adapted to mesh with a bevel wheel 92 which is frictionally mounted on a shaft 93 which has bearings 94 in the tubular member 46. The shaft 93 has associated therewith a clutch connectible bevel wheel 95 (Fig. 21) controllable by a clutch 96 which is operable by a lever 97 (Figs. 1 and 20); bevel wheel 95 meshes with a bevel wheel 98 (see also Fig. 16) on a shaft 99 of a gear box 100 of the engine 101. The engine 101 is mounted upon the main framing 30.

Table 43 is pivotally mounted upon the bracket 45 and the pivot 44 for the said table on the bracket 45 and the axis of the fixed spindle 87 are in alignment (Fig. 11); such construction enables the projecting extension 102 of the casing 82 to rotate within the housing 89 when it is desired to adjust radially the cane gathering, cutting and elevating mechanism of the apparatus. To radially adjust the cane gathering end of the apparatus it is only necessary to operate the screw-threaded rod 104 (Fig. 22) which is fitted with an operating handle 105 connected by a link 106 to one of the elements 41 whereby the cane gathering and associated mechanism of the apparatus may be radially adjusted in relation to the outrigger framing 37.

When the cane gathering end of the apparatus is to be lifted to permit transportation of the apparatus to and from a cane field it is only necessary to operate the handle 110 (Fig. 3) which is associated with a screw-threaded rod 109, one end of which is pivotally connected to one end of a lever 107, whose other end is loosely mounted upon the shaft 36. The lever 107 is adapted to co-operate with the lever 38 when the lever 107 engages a lug 108 (Fig. 22) on the lever 38. Upon operating the rod 109 through the handle 110 the outrigger framing 37 will be raised by the lever 107 abutting the lug 108 on lever 38; the skids 48 and cutters 56 are thus raised clear of the ground. To prevent the gathering end of the apparatus pressing too heavily upon the surface of the ground the tension of the counterbalance spring 40 (Fig. 3) may be regulated through the screw-rod 111.

Shaft 93 (Figs. 2, 9, 10 and 11) has mounted frictionally thereon a pair of sprocket wheels 112 and 113; around the sprocket wheel 112 passes an endless chain 114 which also passes around the sprocket wheels 116, 117 and 118, and the adjustable sprocket wheel 119. The sprocket wheel 113 receives the endless chain 120 and such chain also passes around the sprocket wheels 121 and 122 and the adjustable sprocket wheel 123. All the said sprocket wheels are contained in the housing 125. Sprocket wheels 116 and 117 are respectively affixed to spindles 126 and 127 having bearings in the housing 125 and bracket 128 (Fig. 1). Mounted upon the spindles 126 and 127 are spring tine brushes 130 and 131. Such brushes are of particular construction (Figs. 23 and 24) and they consist of a barrel 135 having a plurality of partition discs 136 and anchor rods 137. The spring tines 138 have their inner ends entwined about the anchor rods 137.

Figures 14, 15:
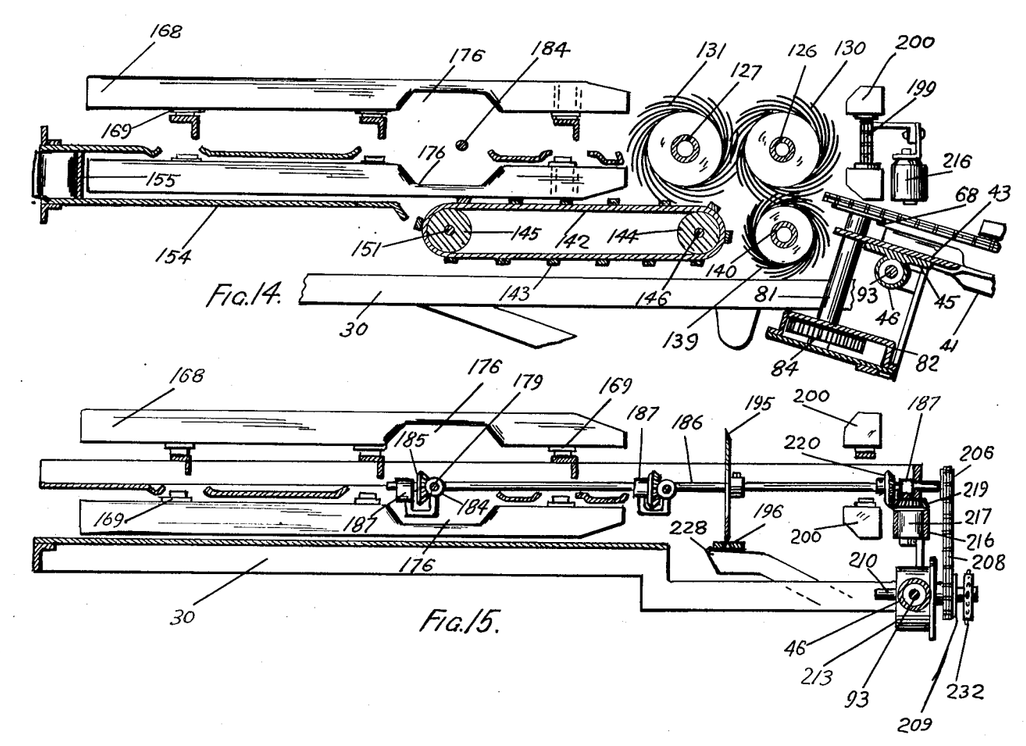
Figs. 14, 15 and 16 are enlarged sectional elevation views respectively on lines 14—14, 15—15 and 16—16 of Fig. 1.
Figure 18:
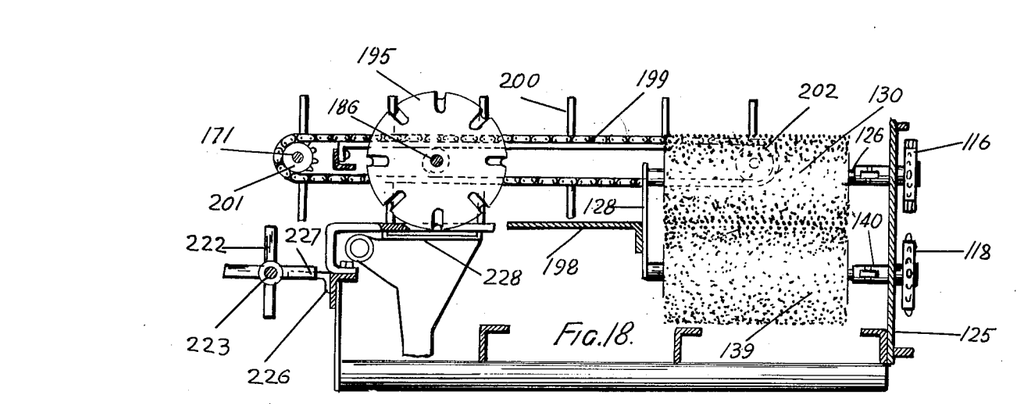
Figs. 18, 19 and 20 are enlarged sectional views respectively on lines 18—18, 19—19 and 20—20, of Fig. 1.

In Fig. 14 the brushes 130 and 131 are in horizontal alignment; positioned below the brush 130 is a brush 139 which is similar in construction to the brushes 130 and 131 and is carried on a spindle 140 having bearings in the housing 125 and bracket 128; said spindle 140 carries the sprocket wheel 118 (Fig. 18). The opposing faces of the brushes 130 and 139 are approximately in alignment with the delivery end of the endless conveyor chains 65 and 66, and the lower brush 139 is rotated in an opposite direction to that of the brush 130. Again the spindles 126, 127 and 140 respectively of the brushes 130, 131 and 139 are set in an oblique transverse position to the delivery end of the endless chains 65 and 66.

Figure 2:
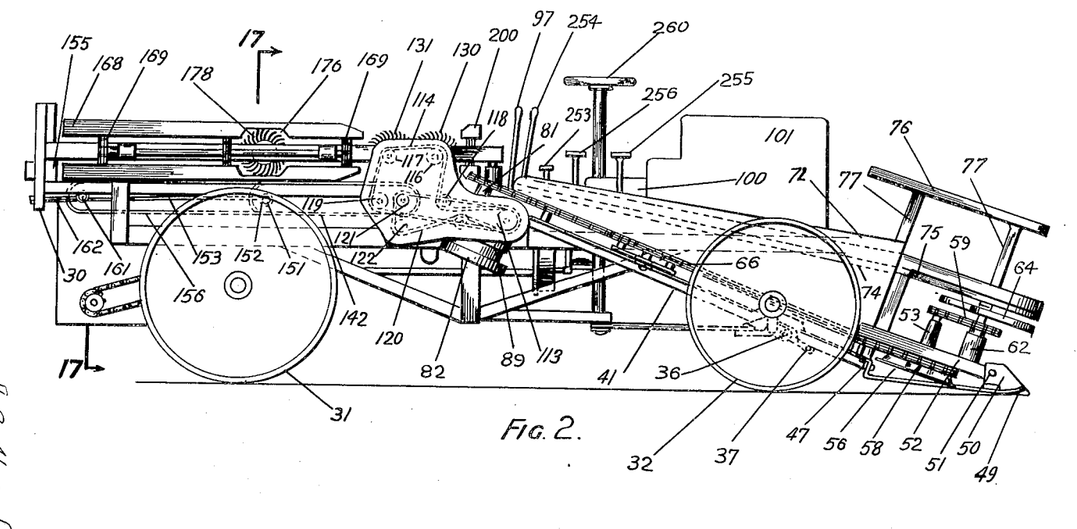
Figs. 2 and 3 are side elevations thereof.
Figure 19:
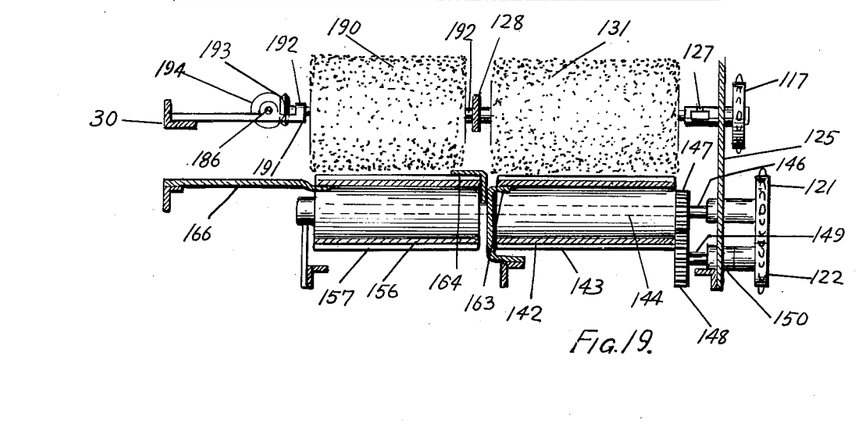

Below the brush 131 and in contact therewith is located a short endless conveyor belt 142 which has transverse strips 143 and is mounted upon rollers 144 and 145 (Fig. 14). The roller 144 is loosely mounted upon the spindle 146 and it is provided with a gear wheel 147 adapted to mesh with a gear wheel 148 (see Fig. 19) on a spindle 149 having bearing 150 in the housing 125; the spindle 149 carries the sprocket wheel 122. The spindle 151 of the other roller 145 (Fig. 14) is mounted in bearings 152 (Fig. 2) which are adjustable by the screw rod 153. Projecting rearwardly of the conveyor belt 142 is a tray 154 having a deflecting end plate 155. Situated laterally of the conveyor belt 142 is another conveyor belt 156 of greater length, and provided with transverse strips 157. The belt 156 is mounted on rollers 158 and 159, the former of which is keyed to the spindle 160 of the other roller 159 is carried in bearings 161 adjustable by the screw rods 162 (Fig. 2).

Figure 17:
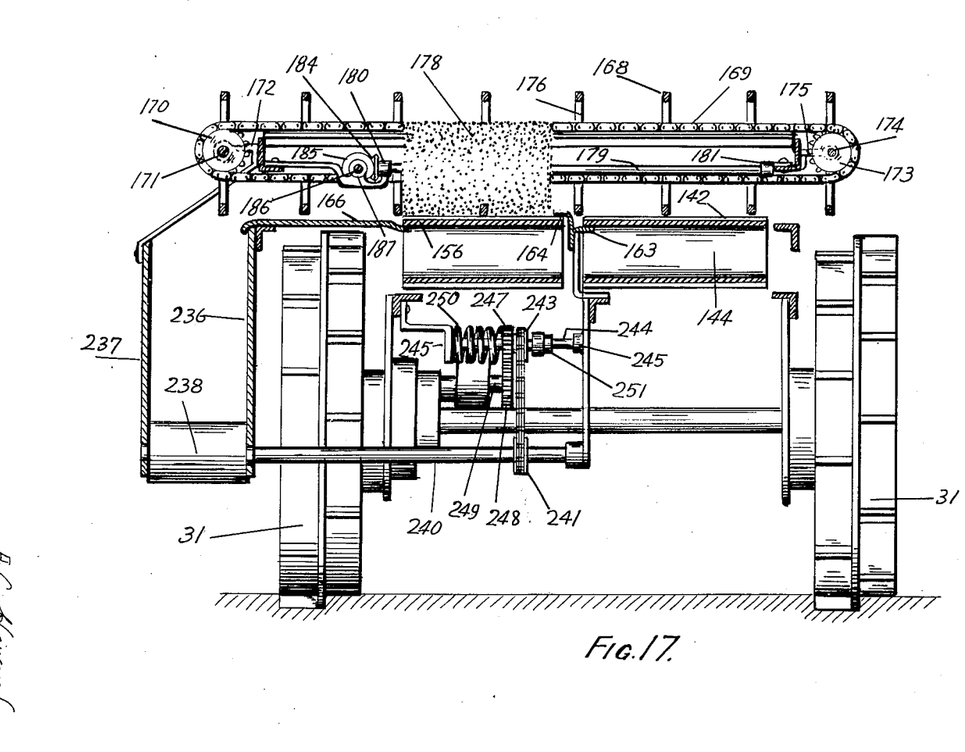
Fig. 17 is a similar view on line 17—17 of Fig. 2.

Located between the contiguous edges of the conveyor belts 142 and 156 (Figs. 17 and 19) are the flanges 163 and 164; the flange 163 is beneath the conveyor belt 142 and the flange 164 is above the belt 156 to permit cane stalks to be easily transferred from the belt 142 to the belt 156.

Situated laterally of the belt 156 is a fixed tray 166. Mounted above and transversely across and close to the belts 142 and 156 and trays 154 and 166 is another conveyor belt having a plurality of laths 168 (Fig. 17) carried by endless chains 169 which pass around sprocket wheels 170 on the spindle 171 carried in fixed bearings 172 on the main framing 30 and also sprocket wheels 173 carried on the spindle 174 in adjustable bearings 175. The laths 168 have portions 176 (Figs. 14, 15 and 16) cut away to accommodate the spring tine brush 178 which is within the conveyor. Brush 178 is mounted upon a spindle 179 which is set in an oblique transverse position to the conveyor belt 156, and is carried in bearings 180 and 181. On the end of the spindle 179 is a bevel wheel 184 which is adapted to gear with a bevel wheel 185 on a shaft 186 journalled in bearings 187. Positioned at one end of the conveyor belt 156 and in contact therewith is another spring tine brush 190 which is mounted upon the spindle 191 carried in bearings 192; spindle 191 is set in parallelism with the spindle 179.

On the end of the spindle 191 is a bevel wheel 193 (Fig. 19) which is adapted to gear with a bevel wheel 194 on the shaft 186. Situated in close proximity to the brush 190 is the rotatable knife 195 working in the knife block 196, such knife being adapted to cut tops from the cane stalks 71. The knife 195 and the knife block 196 are adjustably mounted, the former on the spindle 186 and the latter on the main framing 30.

Forwardly of the knife 195 and the brush 190 is located a tray 198 and also another transverse conveyor consisting of an endless chain 199 and laths 200 (Fig. 18). The endless chain (Fig. 20) passes over a pair of sprocket wheels 201 and 202; the former wheel 201 is mounted upon the shaft 171, and the latter wheel is mounted on the spindle 204 of the adjustable bracket 205. The conveyor 199—200 is in close contact with the tray 198 (Fig. 18).

Shafts 186 and 171 have sprocket wheels 206 and 207 over which passes an endless chain 208; such chain also passes around the sprocket wheel 209 carried on a spindle 210. Spindle 210 is driven by the bevel wheel 211 which meshes with the bevel wheel 212 on the end of the shaft 93 within the housing 213. Located forwardly of the conveyor belt 199 is an endless abutment belt 216 which passes over rollers 217, mounted on spindles 218, rigidly attached to the main framing 30. The spindle of one of the rollers 217 has a bevel wheel 219 which gears with a bevel wheel 220 on the shaft 186, and the spindle of the other end roller 217 is adjustably affixed to the main framing 30. Close to the cane stalk topping knife 195 and located on one side of the apparatus are chopping means for separated tops, such means consisting of a plurality of knives 222 (Figs. 20 and 21) carried on the spindle 223 in bearings 224, said spindle having a sprocket wheel 225 engaging with the endless chain 208. The knife block 226 consists of a plurality of tines 227 and is affixed to the main framing 30. Associated with the topping knife block 196 is an elongated air blast nozzle 228 connected to a blower 229 which may be driven by the endless chain 230 passing around sprocket wheels 231 and 232, the former being on the spindle of the blower and the latter on the spindle 210. Situated near the air nozzle 228 is a tubular air blast nozzle 234.

Affixed to the side of the machine are a pair of vertical fenders 236 and 237 (Figs. 3, 16 and 17) forming a trough and situated at the bottom thereof is an endless conveyor belt 238 which passes around the rollers 239. One of the rollers 239 has its carrying spindle 240 extended and such extension has thereon a sprocket wheel 241. Passing around the sprocket wheel 241 is an endless chain 242 which passes over another sprocket wheel 243 loosely mounted upon a spindle 244 journalled in bearings 245. To the sprocket wheel 243 is affixed a gear wheel 247 adapted to be thrown in and out of gear with the gear wheel 248 on the spindle 249 which is gear driven from the differential gearing of the tractor means of the apparatus (not shown). On the spindle 244 is a coil spring 250 and associated with the combined gear wheel 247 and sprocket wheel 243 is an operating lever 251 which is controlled by the connecting rod 252 on the foot pedal 253.

Associated with the engine 101 is a gear box 100 having a change speed gear lever 254 also a main clutch pedal 255. There is a second clutch pedal 256 which is adapted to operate a clutch 258 affixed to the engine propeller shaft 259 (Fig. 16) whereby transmission drive from the engine may be disconnected from the said propeller shaft.

The wheels 32 are steerable through the steering wheel 260, and a driver's seat 261 is provided on the apparatus.

In operation, the apparatus is first set for cutting cane stalks as previously described; as the apparatus moves forwardly the upstanding cane stalks are gathered into the U-framing 76 and the bight or space X and the fallen stalks are partially lifted (see Fig. 25) on the ramps 50.

The cane stalks are cut by the rotatable cutters 56 and drawn between the chain belts 65 and 66, and in the case of fallen cane as it is cut by the cutters 56 the spoons 58 will help to pull the stalks in so that they will be gripped by the chain belts 65 and 66.

As the upstanding cane stalks are pulled in they will be drawn into the angular contraction 78 of the framing 76 and against the apex 79 thereof. The stalks will thus be caused to fall across the ledge 74 and to lie in echelon form thereon; whereby choking of the trough between the fenders 72 and 73 by the stalks will be prevented.

Cut cane stalks are thus drawn upwardly by the conveyors 65 and 66 by the butt end thereof and at the delivery end of the said conveyors such stalks are forced between the spring brushes 130 and 139; the latter grip each of the stalks and force them between the spring brush 131 and conveyor belt 142. As each stalk is drawn along by the belt 142 and brush 131 it will be simultaneously moved laterally and receive a certain amount of rolling and this is caused by the brushes 130, 140 and 131 being set obliquely.

Furthermore as the stalk passes between the laths 168 of the conveyor 169 the stalks will be gradually moved off the belt 142 onto the belt 156, whilst very long stalks will also be assisted by the deflecting plate 155.

Figures 23, 24, 25, 26:
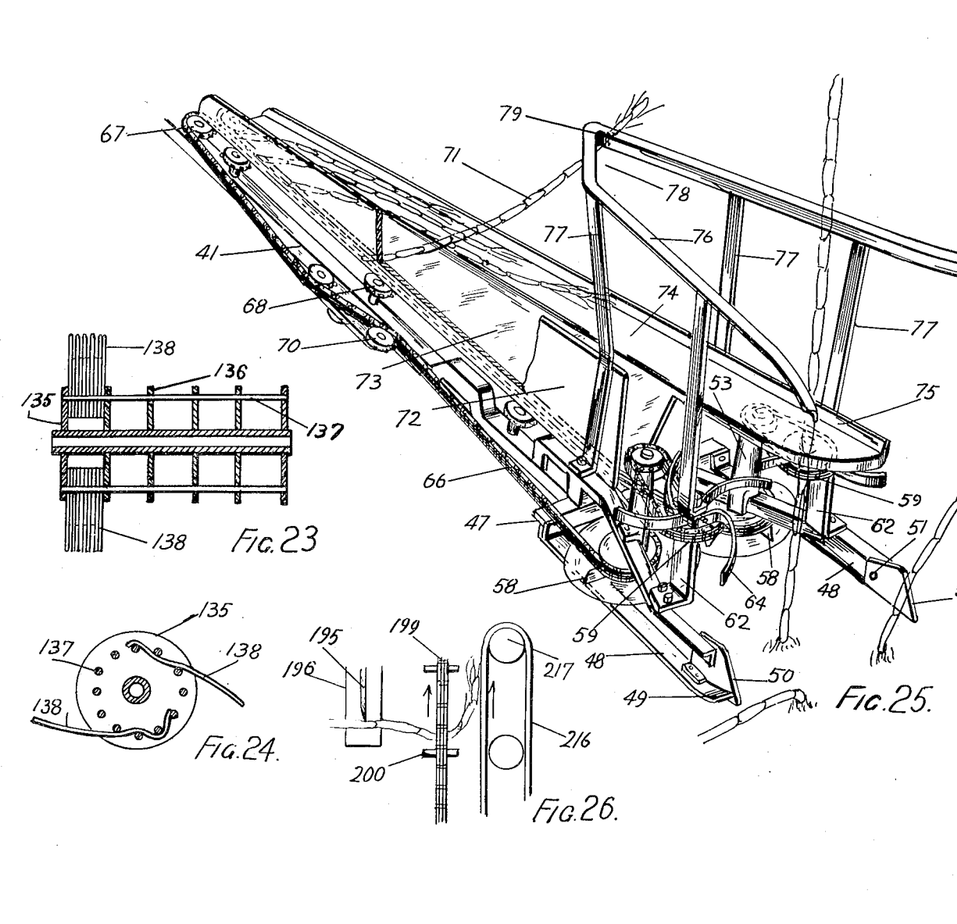
Figs. 23 and 24 are sectional detail views of the wire brushes.
Fig. 25 is a perspective view illustrating the gathering, cutting and elevation of the cane.
Fig. 26 is a diagrammatic view showing the severing of the tops from the cut cane stalks.

During such action the stalks will be thrashed, and on reaching the belt 156 they will be fed forwardly by the belt 156 and brushes 178 and 190, whereby eventually the tops of the stalks will abut the belt 216, and will be bent over (Fig. 26). The conveyor belts 169 and 199 will now force the stalks against the topping knife 195 and thus the top is severed. The severed stalk and top will be forced over the side of the apparatus and the air blasts from the blower means 228-9 and 234 will blow the trash clear of the apparatus; the cut stalks fall into the trough formed by the fenders 237 and 236 and upon the endless belt 238.

When sufficient cane has fallen into the latter trough the driver may operate the foot pedal 253 to enable meshing of the gear wheels 247 and 248; the endless belt 238 will thus be set in motion and so enable the bundle of topped cut cane to be deposited. When such cane has been deposited from the apparatus the pedal 253 upon release permits unmeshing of the gear wheels 247 and 248 by virtue of the action of the spring 250. The severed tops will fall upon the knife block 226 and are cut into short lengths by the chopping knives 222.

To give an intermittent forward movement of the apparatus whilst cutting the cane, the movement thereof may be arrested by the driver operating the pedal 256 which will declutch the engine propeller shaft from the gear transmission and thus allow the harvesting mechanism to continue working. The harvesting mechanism may also be thrown out of action by operating the lever 97 of clutch 96 when the machine is being transported to and from the field.

By adjusting the gathering end of the apparatus as previously described the cutter discs 56 may be set to cut the standing cane stalks either above the ground, at ground level, or slightly below the ground.

Though the invention has been described with reference to the harvesting of sugar cane it will be readily understood that the invention is also applicable for use with other standing crops and the accompanying claims are to be read accordingly.

What I claim as my invention and desire to secure by Letters Patent is:—

1. Cane harvesting apparatus comprising a wheeled structure provided with power drive and with steering means and also with means whereby cane stalks can be gathered and cut and firmly gripped at their butt ends by conveyor means and conveyed thereby in upstanding position rearwardly of the apparatus, fender means associated with the structure and below which such conveyor means passes, and an abutment on the structure in the path of such conveyor means adapted to allow bending of the upstanding cane stalks carried by such conveyor means to enable such stalks to be fed by such conveyor means in butt first position thereof to mechanism on the apparatus for further treatment.

2. Cane harvesting apparatus according to claim 1, in which the cut cane stalks are received from the conveyor means and pass through spring tine brushes which feed the said stalks conjointly with a travelling belt rearwardly of the apparatus and in such movement also roll the said stalks laterally of the apparatus, the said stalks being also carried transversely of the apparatus and then forwardly thereof and in such forward and transverse travel of the said stalks the tops thereof are severed therefrom.

3. Cane harvesting apparatus according to claim 1, in which the abutment means for bending the upstanding cane stalks is constructed and is arranged on the structure to allow contact therewith of the said stalks, whereby in the travel of the conveyor means after contact with the said abutment the said stalks will be formed in echelon horizontal order on the apparatus.

4. Cane harvesting apparatus according to claim 1 in which the fender means are attached to the apparatus above the conveyor and are disposed vertically, one portion of said fenders having a ledge projecting towards the conveyor means and also forwardly towards the gathering means of the apparatus.

5. Cane harvesting apparatus according to claim 1, in which the abutment for allowing bending of the upstanding cane stalks is fitted forwardly of the apparatus and consists of a U-shaped framing provided with a flared mouth and with an angular contraction at its rear portion.

6. Cane harvesting apparatus according to claim 1, in which the cane stalk gathering means, the cane cutting means, and the means for elevating the cut cane stalks are adjustable in relation to the forepart of the apparatus and the ground about such forepart, the said means being adjustably associated rearwardly of the apparatus with a table which is pivotally connected to stationary means on the apparatus.

7. Cane harvesting apparatus according to claim 1, in which the means for adjusting the gathering end of the apparatus in relation to the ground is associated with adjustable spring tension means whereby such end of the apparatus will be prevented from pressing too heavily on the surface of the ground.

8. Cane harvesting apparatus according to claim 1, in which rotatable brushes are provided on the apparatus adapted to receive and to feed therefrom cut cane stalks, the said brushes being constructed of wire strips carried by a framing which is divided by a series of partitions connected by stay rods, and the ends of the wire strips are interlaced with the said stay rods.

9. Cane harvesting apparatus in which the forward end thereof is provided with adjustable gathering devices for cane stalks to be cut, such gathering devices consisting of a pair of skids whose forward ends are curved upwardly, the said skids being inclined outwardly and each skid being disposed on opposite sides of the apparatus, a ramp plate on the outer end of each skid each of such plates being adjustably attached to an arm projecting forwardly of the apparatus, and means on said arms whereby disc cutters for cane stalks are rotatable thereon, and also means whereby spring feeding spoons for the cut cane stalks are rotatable thereon, and also means for spring tines are rotatable thereon, all the said means when in operation being adapted to feed the cut cane stalks to a conveyor associated with the apparatus.

In testimony whereof I affix my signature.
ARTHUR CLIFFORD HOWARD.